United States Patent [19]
Charkey

[11] Patent Number: 5,264,305
[45] Date of Patent: Nov. 23, 1993

[54] ZINC SECONDARY BATTERY HAVING BIPOLAR PLATE CONSTRUCTION WITH HORIZONTALLY DISPOSED BATTERY COMPONENTS

[75] Inventor: Allen Charkey, Brookfield, Conn.

[73] Assignee: Energy Research Corporation, Danbury, Conn.

[21] Appl. No.: 695,437

[22] Filed: May 3, 1991

[51] Int. Cl.⁵ .............................................. H01M 10/30
[52] U.S. Cl. ...................................... 429/152; 429/210
[58] Field of Search ................... 429/210, 152–155, 429/178

[56] References Cited

U.S. PATENT DOCUMENTS

| | | | |
|---|---|---|---|
| 3,306,777 | 2/1967 | Reid et al. | 429/178 X |
| 4,060,670 | 11/1977 | Tamminen | 429/178 |
| 4,539,268 | 9/1985 | Rowlette | 429/152 X |
| 4,891,048 | 1/1990 | Kümmel et al. | 429/152 X |

Primary Examiner—Stephen Kalafut
Attorney, Agent, or Firm—Robin, Blecker, Daley & Driscoll

[57] ABSTRACT

A zinc secondary battery in which a plurality of battery cells are separated by bipolar plates which provide electrical conductivity between the cells and in which the battery cells and bipolar plates are arranged horizontally in a vertical stack.

19 Claims, 1 Drawing Sheet

ZINC SECONDARY BATTERY HAVING BIPOLAR PLATE CONSTRUCTION WITH HORIZONTALLY DISPOSED BATTERY COMPONENTS

BACKGROUND OF THE INVENTION

This invention relates to rechargeable or secondary batteries and, in particular, to secondary batteries using zinc negative electrodes.

Zinc negative electrodes of conventional secondary batteries (e.g., Ni—Zn, Ag—Zn, $O_2$—Zn, etc.) exhibit decay in usable capacity with repetitive charge-discharge cycling of the battery. As the battery and, therefore, each zinc negative electrode is cycled, there is a redistribution and densification of the electrode active material from the edges of the electrode to the electrode center. This results in a loss of surface area of the electrode active material with a concomitant loss of battery capacity.

Over the years, many different battery constructions have been proposed to reduce this zinc electrode "shape change". These different battery constructions have primarily involved attempts at modifying conventional monopolar batteries in which the battery electrodes and other components are vertically disposed in side-by-side relationship. However, these modified monopolar batteries have not been able to fully alleviate the factors believed to contribute to the zinc electrode shape change. These factors include the following:
1. Unequal current regions across the surface of the zinc electrodes which causes zinc active material to dissolve and replate unevenly.
2. Electrolyte pH gradients causing uneven dissolution of zinc active material across the electrode surface.
3. Electrolyte concentration gradients caused by gravity resulting in unequal zincate movement across the zinc electrode during charge and discharge.

It is, therefore, an object of the present invention to provide an improved zinc secondary battery.

It is a further object of the present invention to provide a zinc secondary battery in which cycle life of the battery is increased, while shape change of the zinc negative electrode is reduced.

It is yet a further object of the present invention to provide an improved zinc secondary battery which is sealed and maintenance free.

SUMMARY OF THE INVENTION

In accordance with the principles of the present invention, the above and other objectives are realized in a battery construction employing a plurality of battery cells, each battery cell including a negative zinc electrode and an opposing positive electrode. The battery further comprises conductive bipolar plates or substrates which are arranged with the battery cells such that a bipolar plate is disposed between successive cells and provides electrical conductivity therebetween. With the bipolar plates so arranged, the current through the battery tends to be more uniform. As a result, the negative zinc electrodes tend to undergo less shape change.

In further accordance with the invention, shape change of the zinc electrodes is further reduced by additionally organizing the cells and the bipolar plates horizontally in a vertical stack and by arranging each cell such that its negative zinc electrode is below its positive electrode. By situating the cells and plates horizontally, the effects of gravity and electrolyte stratification are reduced, causing shape change resulting from these effects to also be reduced. The positioning of each zinc negative electrode below its corresponding positive electrode also tends to maintain the zinc electrode closer to the dissolved zinc, thereby promoting replating of the zinc and, likewise, reducing shape change.

In the embodiment of the invention to be disclosed hereinafter, each battery cell includes a separator situated between its respective positive and negative electrodes. Furthermore, a conductive substrate or plate is situated above the top battery cell and below the bottom battery cell. These plates provide electrical connection to accumulator plates of battery terminals whose terminal posts extend from the accumulator plates to points external of the battery. In this embodiment, furthermore, the conductive substrates and bipolar plates are each formed from a conductive plastic material, the battery cells are sealed to prevent escape of electrolyte and the cells and plates are held between compression plates to form a sealed battery unit.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
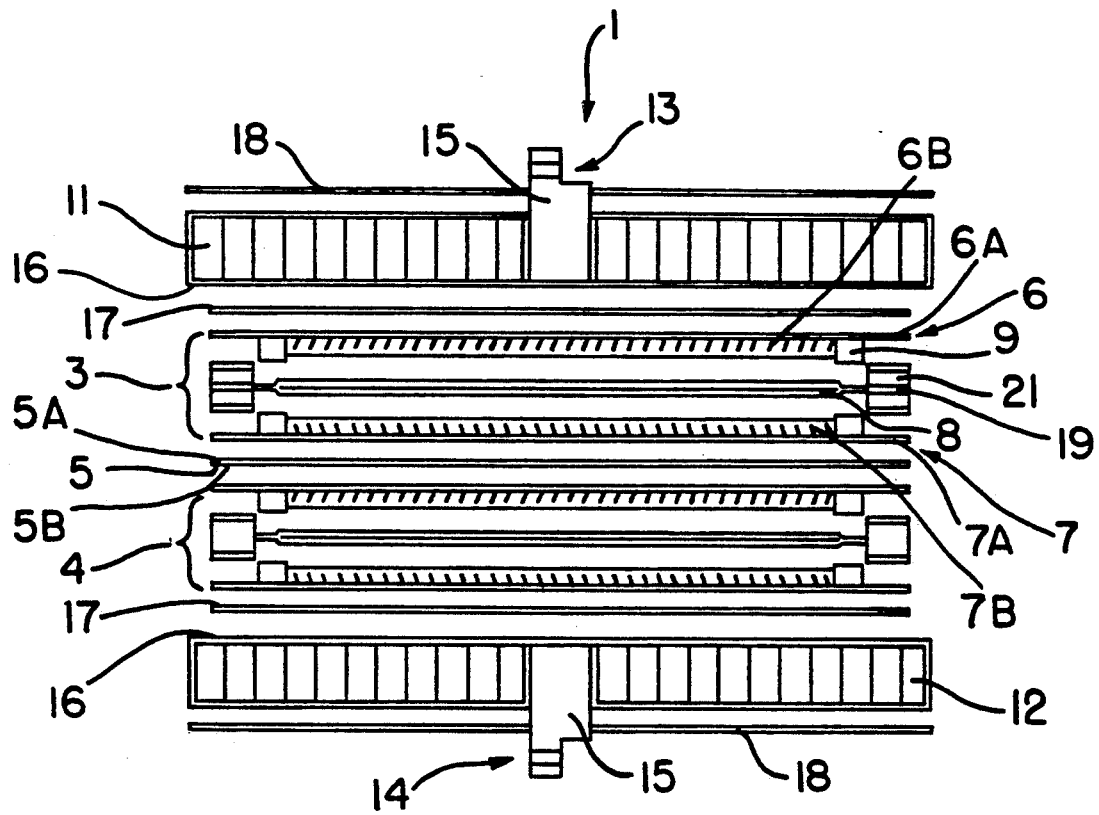
FIG. 1 shows a zinc secondary battery in accordance with the principles of the present invention.

FIG. 1 shows a zinc secondary battery 1 in accordance with the principles of the present invention. As shown, the battery 1 comprises two horizontally disposed, vertically stacked battery cells, shown as upper cell 3 and lower cell 4. Disposed between the cells 3 and 4 is a bipolar conductive plate or substrate 5. The plate 5 has opposing first and second surfaces 5A and 5B and is conductive through the thickness of the plate over the extent of the first and second surfaces. The plate 5 thus connects the cells 3 and 4 electrically so that the cells are in series and their voltages add.

More particularly, each battery cell 3 and 4 comprises a positive electrode component 6, a negative electrode component 7 situated below the positive component 6 and a separator 8 disposed between the positive and negative components 6 and 7. As shown, the positive electrode component 6 of each cell includes a top current collector plate 6A and a bottom positive electrode 6B. Each negative electrode component 7 similarly comprises a top negative zinc electrode 7B and a bottom current collector plate 7A. The bipolar substrate 5 thus abuts on its upper surface 5A the current collector 7A of the negative zinc electrode component 7 of the upper cell 3 and on its lower surface 5B the current collector 6A of the positive electrode component 6 of the lower cell 4.

As illustrated, each of the cells 3 and 4 is further provided with sealing and compression absorbing gaskets which seal the cells against the escape of electrolyte and further permit the cells to be subjected to vertical compression forces in forming the battery 1. Thus, separator seals 9 are situated at the opposite ends of each of the electrodes 6B and 7B of each cell abutting the separator 8. These seals prevent electrolyte from leaking onto the current collectors from the respective separator and electrodes.

Pressure sensitive gaskets 21 are additionally provided in each battery cell between the ends of the current collectors 6A and 7A and bordering the seals 9 to further guard against the escape of electrolyte. These gaskets also absorb compression forces applied to the cells by the end plates 11 and 12 during fabrication of the battery 1, so that these forces do not overly compress and damage the electrodes and other cell components.

As shown, end plates 11 and 12 are of honeycomb configuration and are organized in conjunction with respective positive and negative battery terminals 13 and 14. Each battery terminal comprises a central post 15 which extends through its respective compression plate 11 or 12 to a conductive accumulator plate 16 which borders the surface of the compression plate in the interior of the battery. Each accumulator plate 16, in turn, is electrically connected to the bordering battery cell 3 or 4 through a conductive substrate or plate 17, which is similar in construction to the bipolar plate 5. Insulating members 18 are further provided on the outer surfaces of the compression plates to insulate all but the external ends of the battery posts 15.

With the battery 1 constructed as aforesaid, current from the battery cells 3 and 4 passes vertically upwardly through the horizontally disposed major surface areas of the battery components (i.e., plates 17, current collectors 6A and 7A, electrodes 6B and 7B, bipolar plate 5 and accumulator plates 16). The terminal 14 thus becomes the negative terminal of the battery relative to the terminal 13 and the battery voltage becomes the series sum of the voltages of the cells 3 and 4.

Electrolyte for the battery 1 is carried either in the separators 8 of the cells 3 and 4 or in the electrode regions adjacent such separators. As a result, there is no free electrolyte in the cells. Electrolyte can be introduced into each cell through passages 19 in the gaskets 21. This can be accomplished by introducing tubing through the passages and by using a syringe or like equipment to inject electrolyte through the tubing into the cell.

In forming the battery 1, the conductive substrates 5 and 17 may each comprise a plastic material filled with carbon to make the substrate electrically conductive. A typical material of this type is sold under the name Condulon by James River Co. The substrates, preferably, are also made relatively thin so as to minimize resistance effects of the substrates on current flow. A typical thickness used for the substrates might be 0.1 mm and a typical specific resistance might be 0.7 ohm-cm.

The zinc negative electrodes 7B and the positive electrodes 6B of each cell may each be formed by incorporating the electrode active material with a plastic-like material following the teachings of U.S. Pat. No. 3,898,099, assigned to the same assignee hereof, and which teachings are incoporated herein by reference. The zinc negative electrodes can comprise any number of zinc active materials. A typical material might be ZnO and a typical electrode formulation might be 92% ZnO, 1% CdO, 1% PbO and 6% polyletrafluoroethylene (PTFE).

The positive electrodes 6B, in turn, each may comprise any number of different positive active materials such as, for example, nickel or silver. A typical nickel active material might be $Ni(OH)_2$ and a typical positive electrode formulation might be 66% $Ni(OH)_2$ containing 3% Co(OH), 30% graphite and 4% PTFE. The graphite used in the aforesaid formulation may be spinel coated as taught in U.S. Pat. No. 4,456,058, also assigned to the assignee hereof, and the teachings of which are also incorporated herein by reference.

The current collectors 6A and 7A of each cell can each comprise a conductive foil, such as copper, which has perforations or has been pierced. This foil also may be plated as with silver.

The compression plates 11 and 12 of the battery can be formed as aluminum fabricated in a honeycomb configuration. The accumulator plates 16 of the terminals 13 and 14, in turn, can comprise copper plated with nickel, while the posts 15 can comprise copper.

Various of the components of the battery cells 3 and 4 can be formed as units with the adjacent conductive substrates 5 and 17. Thus, the positive and negative zinc electrode components 6 and 7 of each cell can each be formed as a laminate of its current collector and electrode. This laminate, in turn, can then be itself laminated to the abutting conductive substrate using a conductive bonding adhesive and by applying heat and pressure. In the case of the bipolar substrate 5, the substrate could thus be formed as composite laminate with a negative electrode component 7 laminated to its upper surface and a positive electrode component 6 laminated to its lower surface. Similarly, the upper and lower substrates 17 could be laminated with their adjacent electrode components 6 and 7, respectively.

The separators 8 used in the cells 3 and 4 can comprise a non-conductive porous material which permits ionic flow between the separated electrodes. Typically, each separator might be a multilayered structure to tailor ionic flow. A usable construction might comprise external layers of a non-woven polyamide such as, for example, Pellon 2516, which house internal barrier layers formed, for example, from Celgard K306 manufactured by Hoerscht Chemical.

Any number of electrolytes can be used for each of the cells 3 and 4 of the battery 1. A typical electrolyte might be KOH or a mixture of KOH and LiOH. A particular formulation of such a mixture might contain 35% KOH with 1% LiOH.

While the battery 1 has been illustrated in terms of two battery cells 3 and 4, the battery can comprise any number of horizontally arranged, vertically stacked battery cells. Each successive pair of cells would, of course, be separated by a conductive bipolar substrate 5 to connect the cell pairs electrically in series. Additionally, the positive electrodes can be formed other than from nickel or silver active material. Thus, each positive electrode could also be an oxygen electrode.

With the battery 1 of the invention designed as above-described, the bipolar substrates 5 and the conductive substrates 17 provide greater current uniformity throughout the battery. This tends to minimize over voltage differences between areas on the electrodes and, hence, the occurrence of shape change in the negative zinc electrodes. Also, since current is collected perpendicularly to the electrode surfaces and, simultaneously, through the thin conductive substrates 5 and 17, current densities differences are reduced. This further inhibits shape change of the zinc electrodes.

The horizontal orientation and vertical stacking of the battery components, furthermore, tend to minimize electrolyte concentration gradients caused by gravity. Electrolyte movement is thus lessened as is zinc electrode shape change resulting therefrom. Finally, the cells 3 and 4, as above-indicated, do not contain any free electrolyte. The solubility of zinc active material is thus decreased as is any shape change caused thereby.

It is understood that the above-identified arrangements are merely illustrative of the many possibilities which represent applications of the present invention. Numerous and varied other arrangements can readily be devised in accordance with the principles of the invention without departing from the spirit and scope of the invention.

What is claimed is:

1. A zinc secondary battery comprising:
a plurality of battery cells, said plurality of battery cells constituting all the battery cells in said battery and each battery cell comprising: a zinc negative electrode; and an opposing positive electrode;
a number of conductive bipolar plates, each of said bipolar plates having opposing first and second surfaces and being electrically conductive through the thickness of the plate over the extent of the first and second surfaces;
said battery cells and said conductive bipolar plates being arranged such that between each successive pair of battery cells is a bipolar plate arranged to provide electrical conductivity therebetween;
and said battery cells and said conductive bipolar plates being further arranged horizontally in a vertical stack.

2. A battery in accordance with claim 1 wherein:
said battery cells and said bipolar plates are further arranged such that said bipolar plates connect said battery cells electrically in series so that the voltages of said battery cells are additive.

3. A battery in accordance with claim 2 wherein:
each of said battery cells is arranged in said stack such that the positive electrode of the battery cell is above the zinc negative electrode of the battery cell.

4. A battery in accordance with claim 3 further comprising:
a first conductive plate arranged above and in electrical contact with the upper electrode of the top battery cell in said stack;
and a second conductive plate arranged below and in contact with the lower electrode of the bottom battery cell in said stack.

5. A battery in accordance with claim 1 further comprising:
a first battery terminal electrically connected to said first conductive plate;
and a second battery terminal electrically connected to said second conductive plate.

6. A battery in accordance with claim 5 wherein:
said first battery terminal comprises a first conductive accumulator plate electrically in contact with said first conductive plate;
and said second battery terminal comprises a second conductive accumulator plate electrically in contact with said second conductive plate.

7. A battery in accordance with claim 6 further comprising:
first and second compression plate means disposed adjacent said first and second conductive accumulator plates, respectively, to compress said stack of battery cells and said bipolar plates together.

8. A battery in accordance with claim 7 wherein:
each of said compression plate means has an aperture therethrough;
and said first battery terminal includes a first post which passes through the aperture in said first compression plate means and contacts said first conductive accumulator plate;
and said second battery terminal includes a second post which passes through the aperture in said second compression plate means and contacts said second conductive accumulator plate.

9. A battery in accordance with claim 8 wherein:
each of said first and second compression plate means has a honeycomb structure.

10. A battery in accordance with claim 8 wherein:
each of said battery cells further includes: an electrically non-conductive separator between the positive and zinc negative electrodes of the battery cell; and for each of the electrodes of the cell a conductive current collector abutting a surface of the electrode.

11. A battery in accordance with claim 10 wherein:
each of said battery cells further includes: a separator seal situated at each end of each of the positive and zinc negative electrodes; and a gasket situated at each end of the cell abutting the separator seals at that end of the cell.

12. A battery in accordance with claim 1 wherein:
each bipolar plate comprises a conductive plastic.

13. A battery in accordance with claim 12 wherein:
said plastic is made conductive by carbon included in said plastic.

14. A battery in accordance with claim 1 wherein:
each battery cell further comprises an electrically non-conductive separator situated between the positive and zinc negative electrode of that cell.

15. A battery in accordance with claim 14 wherein:
each battery cell further comprises: an electrolyte confined to the separator of the cell and to the regions of the positive electrode and zinc negative electrode adjacent said separator.

16. A battery in accordance with claim 15 wherein:
said electrolyte comprises KOH.

17. A battery in accordadnce with claim 15 wherein:
each battery cell further includes means adjacent the ends of the separator and electrodes of the cell for sealing the cell against escape of electrolyte.

18. A battery in accordance with claim 1 wherein:
said positive electrodes of said battery cells each comprises one of nickel and silver active material.

19. A battery in accordance with claim 1 wherein:
said positive electrodes of said battery cells are oxygen electrodes.

* * * * *

UNITED STATES PATENT AND TRADEMARK OFFICE
CERTIFICATE OF CORRECTION

PATENT NO. : 5,264,305
DATED : November 23, 1993
INVENTOR(S) : Allen Charkey

It is certified that error appears in the above-indentified patent and that said Letters Patent is hereby corrected as shown below:

Col. 5, line 48. Change "1" to -- 4 --

Signed and Sealed this

Nineteenth Day of April, 1994

Attest:

BRUCE LEHMAN

Attesting Officer     Commissioner of Patents and Trademarks